United States Patent
Norton et al.

[11] 3,774,628
[45] Nov. 27, 1973

[54] PRESSURE REGULATOR

[75] Inventors: David C. Norton; William Ancira, both of Richmond, Ind.

[73] Assignee: Avco Corporation, Richmond, Ind.

[22] Filed: Sept. 24, 1971

[21] Appl. No.: 183,555

[52] U.S. Cl. ........ 137/115, 137/505.18, 137/505.41, 137/625.5
[51] Int. Cl. .......................................... F16k 17/04
[58] Field of Search .................... 137/115, 505.41, 137/505.18, 625.5, 118, 119

[56] References Cited
UNITED STATES PATENTS

| | | | |
|---|---|---|---|
| 3,216,209 | 11/1965 | Krigsman | 137/625.5 X |
| 2,091,051 | 8/1937 | Mesinger | 137/505.18 |
| 3,578,014 | 5/1971 | Grachot | 137/115 |
| 3,682,437 | 8/1972 | Miller | 137/505.41 |
| 2,631,412 | 3/1953 | Work | 137/505.18 |
| 3,075,545 | 1/1963 | Eichelman | 137/505.18 |
| 3,605,800 | 9/1971 | Satoh | 137/505.18 |

*Primary Examiner*—Harold W. Weakley
*Attorney*—Charles M. Hogan et al.

[57] ABSTRACT

A pressure regulator for accurately regulating fluid pressure at extremely low levels, such as .300 psi, is disclosed. The pressure regulator accurately regulates fluid pressure above an ambient or a reference pressure over a wide range of inlet supply pressures. The pressure regulator has a valve and piston design which is insensitive to the supply pressure. A static pressure vent insures that variations in ambient or reference pressure will not adversely affect the operating pressure level. Adjustment means also permits fine tuning of the regulator to a desired operating level.

4 Claims, 3 Drawing Figures

PATENTED NOV 27 1973

3,774,628

INVENTORS
DAVID C. NORTON
WILLIAM ANCIRA

BY Charles M. Hogan

Eugene C. Hordal

ATTORNEYS

PRESSURE REGULATOR

BACKGROUND OF THE INVENTION

This invention relates generally to regulators and more particularly to a pressure regulator which accurately regulates fluid pressure at a pressure a fraction of one pound per square inch above the ambient or reference pressure (psi) over a wide range of pressures.

Many pressure regulators are known in the art. Standard regulators are accurate for regulating pressures above 2 psia. However, for regulating pressures below 2 psia, over a wide range of supply pressures, standard regulators are not sufficiently accurate for use in conjunction with fluidic devices which are required to operate at high altitudes; such devices demand an accurate, low pressure, regulated fluid supply. An example of uses of such fluidic systems are bomb, mortar and rocket fuzes. In these types of products, it is necessary that there is a means of accurately regulating fluid pressure at extremely low levels over a wide range of supply pressures.

Accordingly, it is an object of this invention to provide a pressure regulator for accurately regulating fluid pressure at extremely low levels over a wide range of supply pressures.

A further object of this invention is to provide a pressure regulator in which the operating pressure level is not adversely affected by the ambient or reference pressure.

Yet another object of this invention is to provide a pressure regulator which is of simple and economical construction yet provides positive control of regulating pressures below 2 psia over a wide range of supply pressures.

SUMMARY OF THE INVENTION

This invention provides an improved pressure regulator for accurately regulating fluid pressure at extremely low levels, such as 0.300 psi. The regulator comprises supply, regulating, and static chambers. A valve controls the fluid flow between the supply and regulating chambers in response to a diaphragm separating the regulating and static chambers. A static pressure vent and a supply pressure bleed port insures that variations in ambient or reference pressure will not adversely affect the operating pressure level. Means are provided which permit the regulator to be fine tuned to the desired operating level.

Other objectives, details, uses and advantages of this invention will become apparent as the following description of an exemplary embodiment therof presented in the accompanying drawings proceeds.

BRIEF DESCRIPTION OF THE DRAWINGS

The accompanying drawings show a present exemplary embodiment of this invention in which.

DESCRIPTION OF THE ILLUSTRATED EMBODIMENT

Figure 1:
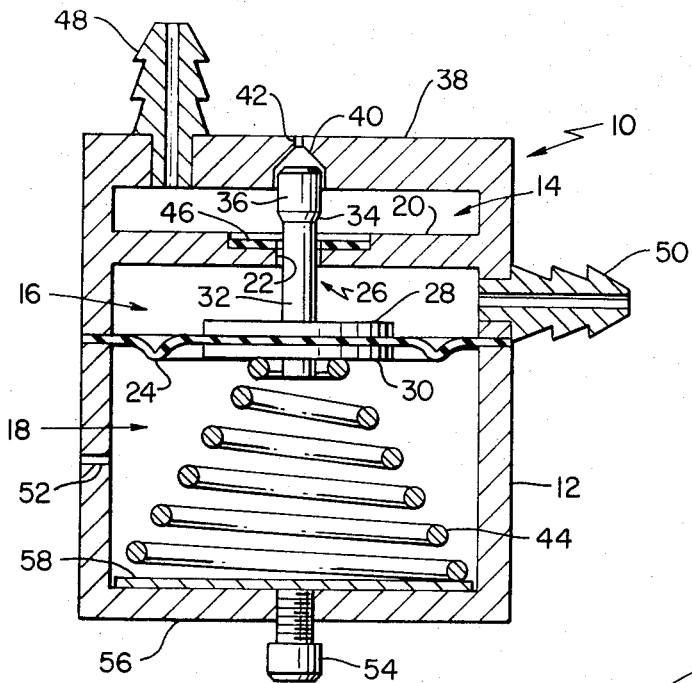
FIG. 1 is a cross-sectional view of the pressure regulator in the neutral position.
Figure 2:
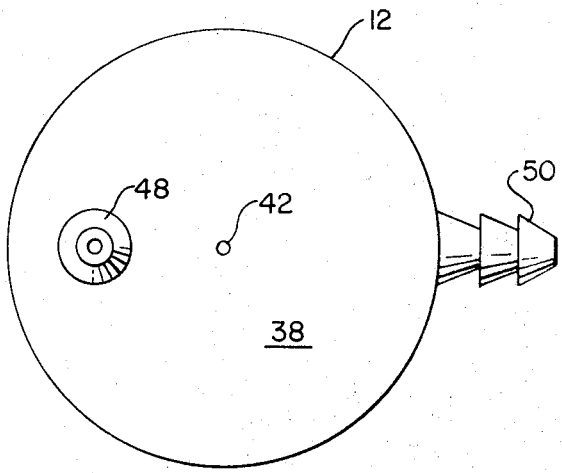
FIG. 2 is a top view of the pressure regulator of FIG. 1.

Reference is now made to FIGS. 1 and 2 of the drawings, which illustrate one exemplary embodiment of the improved pressure regulator of this invention, which is designated generally by the reference numeral 10. The pressure regulator 10 is comprised of a cylindrical housing 12 which defines therein a supply chamber 14, regulating chamber 16, and a static chamber 18. The supply chamber 14 and regulating chamber 16 are separated by a wall 20 having an axial bore 22 therethrough. The bore 22 serves as a fluid flow valve in cooperation with a piston, generally designated as 26, in a manner to be described hereinbelow. The regulating chamber 16 and static chamber 18 are separated by a diaphragm 24 which is secured at its periphery to the housing 12.

The piston 26, located axially in the regulator 10, is rigidly secured to the diaphragm 24 by means of pressure plates 28 and 30 which are placed on either side of the diaphragm 24. The piston 26 is a double diameter round shaft in which the small diameter 32 extends through the flow valve which is located in axial bore 22 and is connected by a taper 34 with the larger diameter portion 36. The housing top 38 is formed with a bore 40 into which the piston shaft 36 may extend with a clearance fit resulting in low friction. An exit aperture or vent 42 connects the bore 40 with the external environment of the regulator 10. The shaft 32 is smaller than the valve opening provided in axial bore 22 while the shaft 36 is larger than the valve opening. Hence, when the piston 26 is positioned in a neutral position by the diaphragm 24, as seen in FIG. 1, the valve 22 is open and the supply chamber 14 is in communication with the regulating chamber 16. The diaphragm 24 is supported by a regulating spring 44 mounted in the static chamber 18. When the supply pressure is off, the spring 44 holds the diaphragm 24 in the neutral position. The axial bore 22 is provided with a seal 46, such as a rubber gasket, to provide an efficient seal when the valve is closed.

A fluid input port 48 provides communication from a fluid supply source (not shown) to the supply chamber 14. A fluid output port 50 provides communication between the regulating chamber 16 and any suitable fluid utilization means (not shown).

The pressure regulator 10 contains two bleed ports, the aperture 42 is the supply pressure bleed port of a size relative to the clearance between the piston 36 and the bore 40 which assures that a pressure head cannot be established on top of the piston shaft 36 which would cause the regulating pressure level to vary as the supply pressure is changed. An aperture 52 is in communication with the static chamber 18 and is the static pressure bleed port. The aperture 52 assures that the pressure in the static pressure chamber 18 is always maintained at the actual surrounding atmospheric pressure.

The pressure regulator 10 may be fine tuned to the desired operating level through the use of adjusting screw 54 which is threaded through the base 56 of the housing 12. The screw 54 acts on a plate 58 upon which the spring 44 rests. Thus, by turning the screw 54, the plate 58 may be raised or lowered which will change the reaction force acting on the diaphragm 24.

Figure 3:
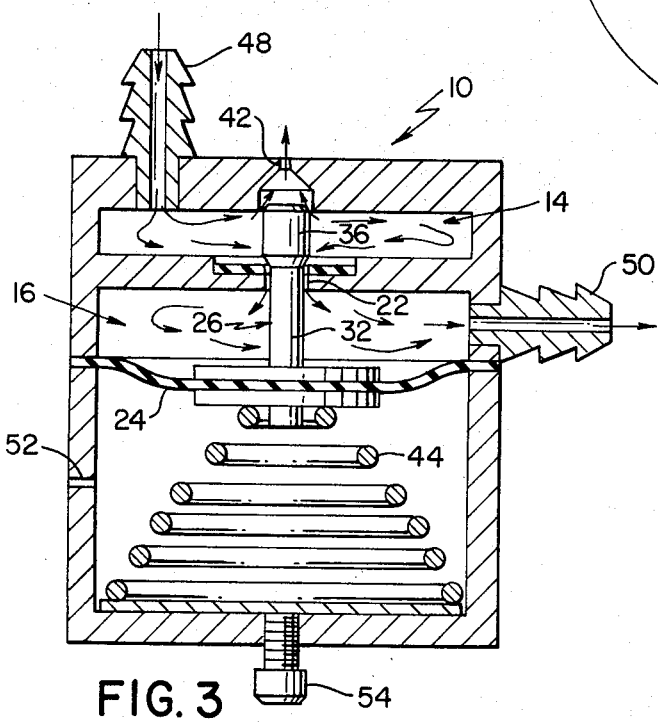
FIG. 3 is a cross-sectional view similar to FIG. 1 showing the regulator in the regulating mode.

The principle of operation is readily seen by referring to FIG. 3 which shows the regulator 10 in the regulating position. Pressurized fluid enters the supply chamber 14 through the input port 48. The chamber 14 then pressurizes to the actual fluid supply pressure. If the supply pressure is below the regulating level as shown in FIG. 1, the fluid passes through the open valve into the regulating chamber 16. The chamber 16 then pressurizes to the supply pressure level without deflecting the diaphragm 24. The pressure of the fluid exiting the regulator 10 from the output port 50 then equals the input supply pressure.

When the input supply pressure exceeds the regulating pressure, the diaphragm 24 is urged against the spring 44 when the regulating chamber 16 pressurizes to the regulating level thereby pulling the piston 26 down into the axial bore 22. The shaft portion 34 then engages the rubber gasket 46 to close the valve to prevent further fluid from entering the regulating chamber 16. In so doing, the fluid is vented from the supply chamber 14. The fluid in the regulating chamber 16 is vented through the output port 50. When sufficient fluid has vented from the chamber 16 to allow the pressure in this chamber to drop below the regulating level, the regulating spring 44 forces the diaphragm 24 back toward its neutral position. This movement of the diaphragm urges the piston 26 in the axial direction to open the valve. Fluid at the supply pressure then again enters the regulating chamber 16 through the partially opened valve. The diaphragm 24 stabilizes at a position which allows fluid to pass through the axial bore 22 at a flow rate equal to the flow rate of the fluid exiting the output port 50. When the input supply pressure is changed, the diaphragm 24 again seeks a new position such that the fluid flow rate into the regulating chamber 16 equals the fluid output flow rate. If it is desired to change the operating level of the regulator 10, the adjusting screw 54 is threaded into or out of the wall 56. It should be noted that if a large change in the operating level is desired, the spring 44 may be replaced with a different spring.

It can be seen that the pressure regulator of this invention is of simple and economical construction and is fool-proof in operation. Ths regulator may be adjusted to varying degrees of operating level, the piston is insensitive to the supply pressure surrounding it and the static chamber 18 is vented to the surrounding atmosphere so that the static pressure will be independent of the operating pressure level. Accordingly, it is seen that the objects hereinbefore set forth have been accomplished.

While a present exemplary embodiment of this invention has been illustrated and described, it will be recognized that this invention may be otherwise variously embodied and practiced by those skilled in the art.

What is claimed is:

1. A fluid pressure regulator operating at low output pressure levels over a wide range of input supply pressure levels comprising:
    a housing defining a supply chamber; a regulating chamber, and a static chamber;
    valve means in said housing between said supply chamber and said regulating chamber;
    a diaphragm separating said regulating chamber and said static chamber;
    a piston secured to said diaphragm and extending axially through said valve means into said supply chamber, said piston and said valve means being complementally formed to stop flow from said supply chamber to said regulating chamber in response to excessive movement of said diaphragm;
    a bore formed in the housing opening into said supply chamber and opposite said piston, one end of said piston being linearly movable in said bore with preselected clearance and negligible friction between said piston and said bore;
    said bore terminating in a bleed port in said housing, said bleed port providing communication between said bore and the surrounding, ambient atmospheric pressure, said bleed port having an area substantially larger than the flow path between the sides of said piston and said bore to bleed fluid from said bore to prevent a buildup of a head pressure on the end of said piston greater than ambient pressure;
    a second bleed port formed in said housing, said second port being in communication with said static chamber wherein the pressure in said static chamber is maintained at the actual surrounding atmospheric pressure;
    a spring mounted in said static chamber, said spring acting against said diaphragm for holding said diaphragm in a neutral position in the absence of excessive pressure in said pressure chamber wherein said valve means is open whereby flow may occur from said supply chamber to said regulating chamber;
    an inlet supply port in communication with said supply chamber for providing fluid thereto; and
    an outlet port in communication with said regulating chamber for providing fluid flow from said regulating chamber.

2. The pressure regulator as set forth in claim 1 further comprising adjustment means acting on said spring to permit adjustment of the regulator to the desired operating level.

3. The pressure regulator as set forth in claim 2 in which said piston means is a double-diameter shaft, the two diameters being blended together with a tapered portion of the shaft, the smaller diameter shaft being smaller than said valve means and extending therethrough and the larger diameter portion being greater than the valve opening wherein the tapered portion of said shaft cooperates with the valve opening to regulate the amount of fluid passing through the valve in response to shaft movement due to diaphragm movement.

4. The pressure regulator as set forth in claim 3 in which said valve means comprises a rubber gasket in which the orifice is smaller than said larger portion of the shaft and larger than said smaller portion of the shaft.

* * * * *